July 17, 1962  J. KEHLER  3,044,509
TREE STUMP CUTTER ATTACHMENT
Filed July 30, 1959  2 Sheets-Sheet 1

INVENTOR:
JACOB KEHLER:
By
Fetherstonhaugh Hart
HIS ATTYS.

July 17, 1962 J. KEHLER 3,044,509
TREE STUMP CUTTER ATTACHMENT
Filed July 30, 1959 2 Sheets-Sheet 2

INVENTOR
JACOB KEHLER
By
Fetherstonhaugh & Kent
HIS ATTYS.

United States Patent Office 3,044,509
Patented July 17, 1962

3,044,509
TREE STUMP CUTTER ATTACHMENT
Jacob Kehler, 1557 Colonization Road W.,
Fort Francis, Ontario, Canada
Filed July 30, 1959, Ser. No. 830,575
1 Claim. (Cl. 144—2)

My invention relates to new and useful improvements in tree stump cutters. After land logged, it is often desirable to remove the tree stumps which may extend a considerable distance from the surface of the ground. In certain instances this can be accomplished by means of bulldozer or the like but this type of implement is not available normally.

My stump cutter which can be used with conventional tractors and consists basically of a cylindrical drum rotating horizontally and having cutting teeth around the periphery of said drum. By connecting the drum to the power take off of the tractor, and by providing means to swing the drum either vertically or horizontally, I have provided a device which readily removes tree stumps to ground level or below and which is adaptable to any type of tractor having a power take off drive.

The principal object and essence of my invention is therefore to provide a horizontally rotating stump cutting cylinder universally mounted upon the rear end of a tractor.

A further object of my invention is to provide a device of the character herewithin described which is particularly suitable for maneuvering in restricted areas.

Yet another object of my invention is to provide a device of the character herewithin described in which the cutter bars are easily removed for sharpening or replacement.

Still another object of my invention is to provide a device of character herewithin described which is simple in construction, economical in manufacture, and otherwise well suited for the purpose for which it is designed.

With the foregoing objects in view and such other objects and advantages as will become apparent to those skilled in the art to which this invention relates as this specification proceeds, my invention consists essentially in the arrangement and construction of parts all as hereinafter more particularly described, reference being had to the accompanying drawings in which.

In the drawings like characters of reference indicate corresponding parts in the different figures.

Figure 3:
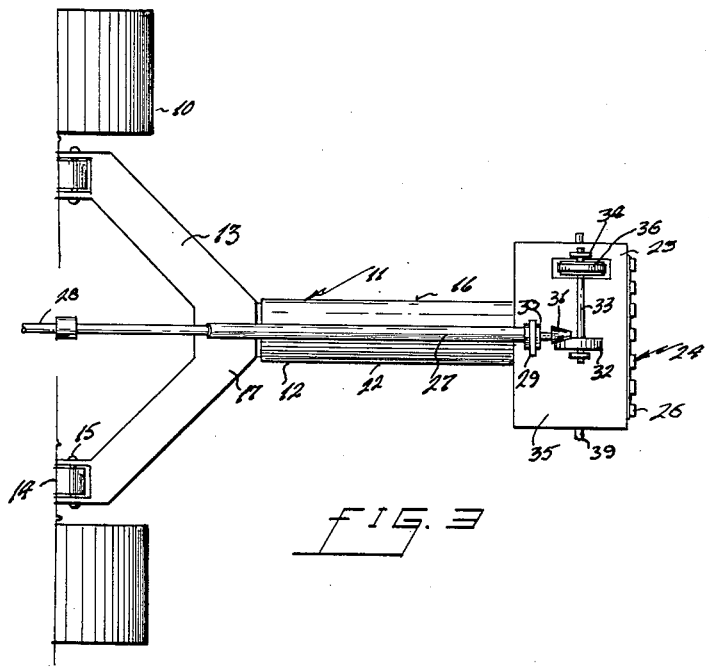
FIGURE 3 is a top plan view of an alternative embodiment of my device secured to the rear end of a tractor.
Figure 4:
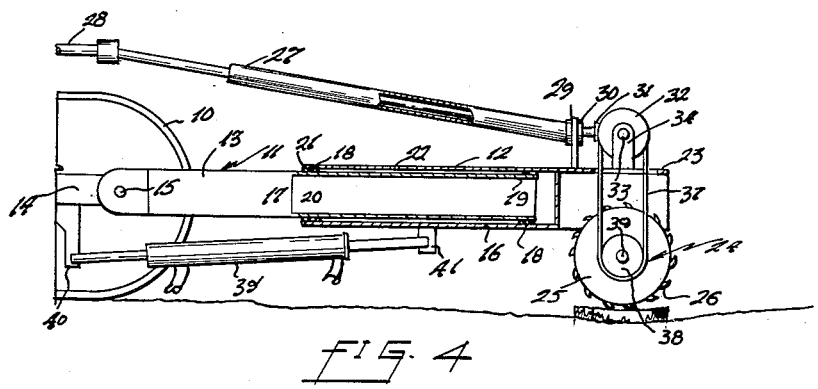
FIGURE 4 is a side elevation of FIGURE 3 sectioned in part to show the interior thereof.

Dealing first with the device illustrated in FIGURES 3 and 4, reference character 10 represents the rear end of a caterpillar type tractor to which my device collectively designated 11 is secured. My device includes a supporting component 12 consisting of a yoke 13 pivotally secured to bracket 14 on the tractor by means of pivot pin 15 so that the device can pivot vertically around the pin 15.

A telescopic tube 16 is secured to apex 17 of the yoke and extends rearwardly of the tractor. FIGURE 4 will show that collars 18 are secured to the outside ends 19 of the interior tube 20 and to the inside end 21 of the outer tube designated 22. This prevents tubes from being extended beyond the limit of the collar engagement and yet at the same time permits very considerable extension of the main supporting component as may be desired.

A housing 23 is secured to the end of the telescopic tube 16 transversely thereacross, said housing have a stop cutting component collectively designated 24, journalled for rotation therein. It will be observed that the component 24 consists basically of a cylinder 25 mounted horizontally across the housing and having cutting teeth or elements 26 secured to the perimeter thereof.

A telescopic drive shaft 27 extends from the power take off 28 of the tractor and is supported within bearing 29 upon the housing by means of universal joint 30. A bevel gear 31 secured to the end of the drive shaft 27 and meshes with a further bevel gear 32 which in turn is secured to a cross shaft 33 journalled within bearing 34 upon the upper side 35 of the housing 23.

A belt pulley 36 is secured upon the other end of the cross shaft 33 and a belt 37 extends around this pulley and around a further pulley 38 secured to the shaft 39 and carrying the front cutter component 24.

Means are provided to extend the telescopic fork component 16 as well as to pivot the device vertically around pivot pin 15, taking the form of a hydraulic cylinder and piston assembly 39' extending between a support 40 on the tractor and a bracket 41 on the support component 16. This hydraulic cylinder is connected to the hydraulic system (not illustrated) of the tractor and may be controlled from adjacent the operator's seat.

Figures 1, 2, 6:
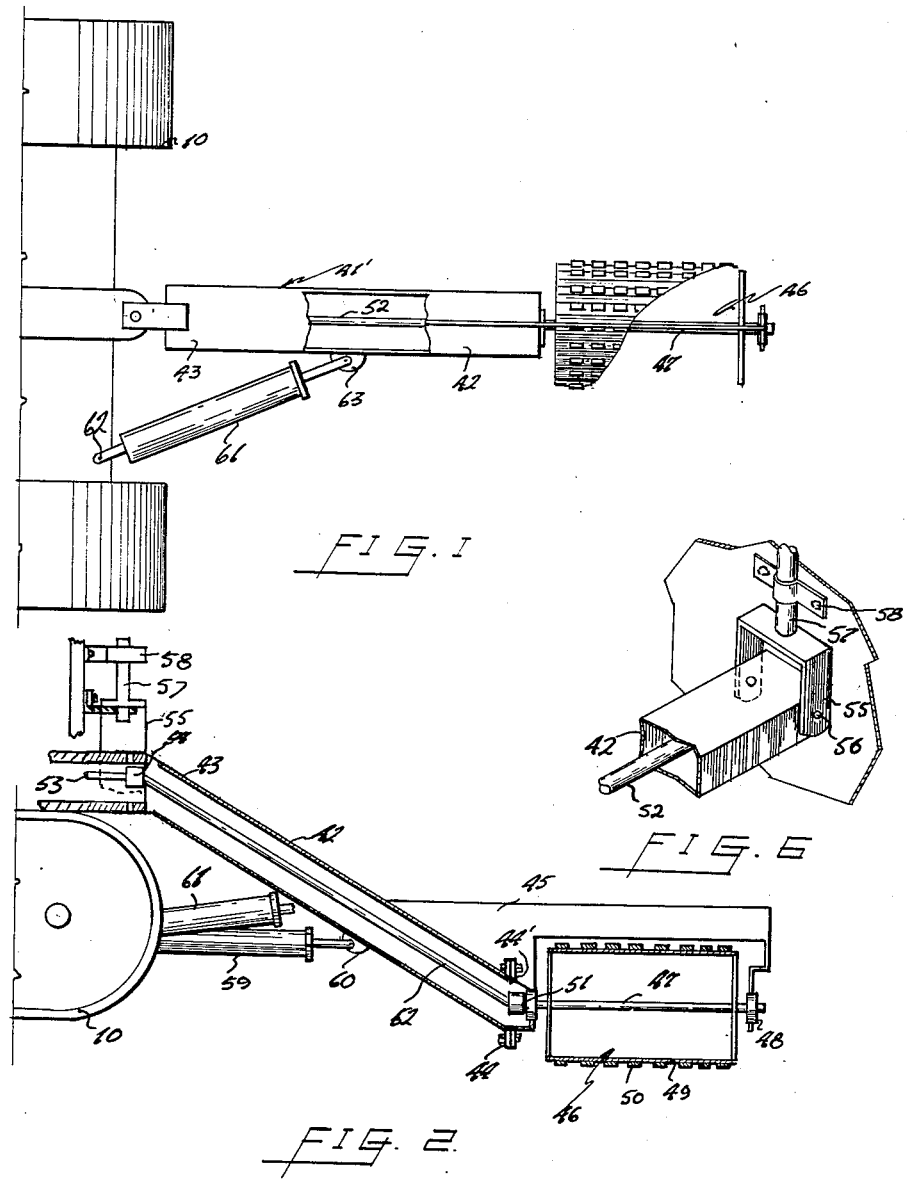
FIGURE 1 is a top plan view of the preferred embodiment of my device showing same attached to the rear end of a tractor.
FIGURE 2 is a side elevation of FIGURE 1 sectioned in part to show the interior thereof.
FIGURE 6 (Sheet 1) is a fragmentary perspective view showing the pivotal attachment of the support components to the rear end of the tractor.

Dealing next with the preferred embodiment shown in FIGURES 1 and 2, reference character 10 designates the tractor and reference character 46 generally indicates my cutting device.

In this embodiment, I have provided a support component consisting of a tube 42 pivoted adjacent the end 43 thereof to the tractor and extending downwardly and rearwardly therefrom, terminating in a flange 44. An overhanging bracket 45 extends from the tube 42 substantially horizontally therefrom, said bracket carrying my cutting component collectively designated 46 as clearly shown in FIGURE 2.

The cutting component 46 consists of supporting spindle 47 journalled within bearing 48 and having a cylindrical drum 49 secured thereto, said drum carrying elements 50 around the periphery thereof.

Flange 44 is engaged by further flange 44' and secures the bracket 45 and the cutting component 46 to the main support component 42, it being observed that a universal joint 51 is provided upon one end of shaft 47 where it joins the drive shaft 52.

This drive shaft passes through the tube 42 and connects to the power take off 53 of the tractor by means of a further universal joint 54.

FIGURE 6 shows the pivotal connection of the support component 42 to the tractor which consists of a clevis 55 within which the end 43 of the tube is pivotally supported for movement in a vertical plane by means of pivot pin 56. This clevis includes a vertical spindle 57 extending upwardly therefrom and being journalled within bearing 58 extending from the tractor so that the clevis together with the assembly held thereby can pivot in a horizontal plane.

Hydraulic piston and cylinder assembly 59 extends from the tractor to bracket 60 upon the tube 42 and by connection of this hydraulic assembly to the hydraulic system of the tractor, the device can be raised and lowered in a vertical plane.

A further piston and cylinder assembly 61 extends between a point 62 of the tractor and a bracket 63 on the side of the cylinder so that by connecting this piston and cylinder assembly to the hydraulic system, the device is adapted to swing in a horizontal plane.

Figure 5:
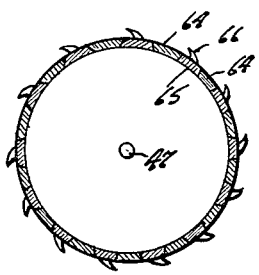
FIGURE 5 is an enlarged cross sectional view of the cutting cylinder.

Finally reference should be made to FIGURE 5 which shows one embodiment of my cutting cylinder. Around the perimeter of the cylinder I have provided dovetailed wedge blocks 64. The cutter carrying bars 65, when viewed in cross section, are reverse dovetailed to the block 54 and are adapted to engage between adjacent block 64 thus wedging same into position. The cutting elements 66 are of course secured to the bar 65 and this facilitates the removal of the bar for sharpening or replacement of the cutting teeth.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

A device for cutting tree stumps and the like adapted to be mounted on a source of power such as a tractor and the like and to be driven thereby; comprising in combination a supporting component pivoted for movement in the vertical plane to the said source of power and extending therefrom, a cylindrical stump cutting component journalled for substantially horizontal rotation upon the end of said supporting component remote from said source of power, drive means extending between said cutting component and said source of power, means extending between said source of power and said supporting component to control said movement in the vertical plane, said supporting component being pivoted for movement in the horizontal plane, as well as in the vertical plane, and further means also extending between said source of power and said supporting component to control said movement in the horizontal plane, said supporting component including a tube pivotally secured by one end thereof within a clevis, for said vertical pivoting movement, said clevis being journalled for rotation in a horizontal plane to said source of power, a drive shaft extending through said tube and being connected by one end thereof to the power take off of said source of power and by the other end thereof, axially, to said cylindrical cutting component.

References Cited in the file of this patent

UNITED STATES PATENTS

| | | |
|---|---|---|
| Re. 15,165 | McKoy et al. | July 26, 1921 |
| 1,049,589 | Mitchell | Jan. 7, 1913 |
| 1,417,425 | Thompson | May 23, 1922 |
| 1,467,430 | Hurd | Sept. 11, 1923 |
| 1,485,527 | Raeber | Mar. 4, 1924 |
| 2,616,238 | Hodgkinson et al. | Nov. 4, 1952 |
| 2,684,695 | Howell | July 27, 1954 |
| 2,822,839 | Frodermann | Feb. 11, 1958 |
| 2,887,134 | Bartlett | May 19, 1959 |

FOREIGN PATENTS

| | | |
|---|---|---|
| 500,187 | Germany | June 19, 1930 |